March 13, 1951 F. V. RAHNER 2,545,382
PORTABLE PHOTOGRAPHIC LIGHT HAVING AN
ADJUSTABLE LIGHT CHAMBER
Filed Oct. 23, 1946 2 Sheets-Sheet 1
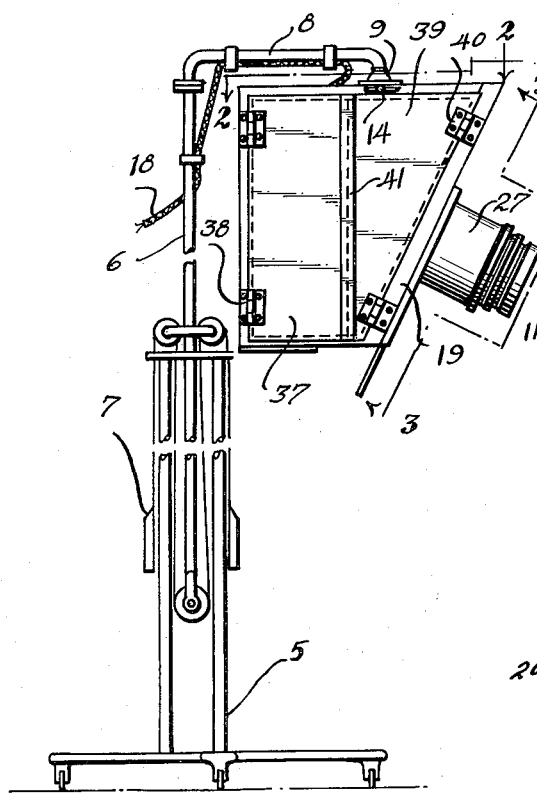
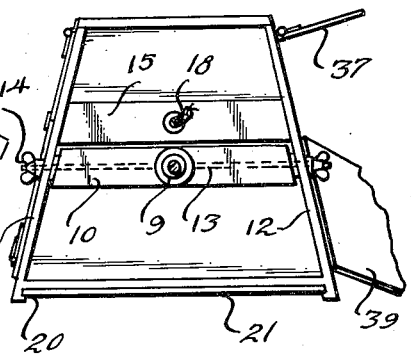
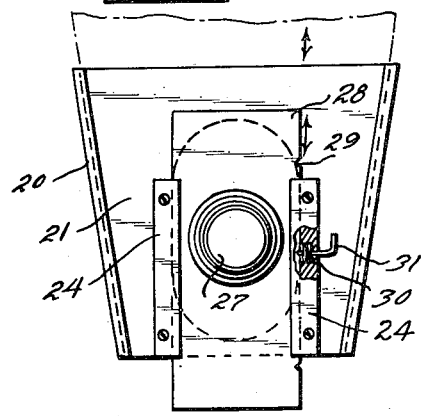
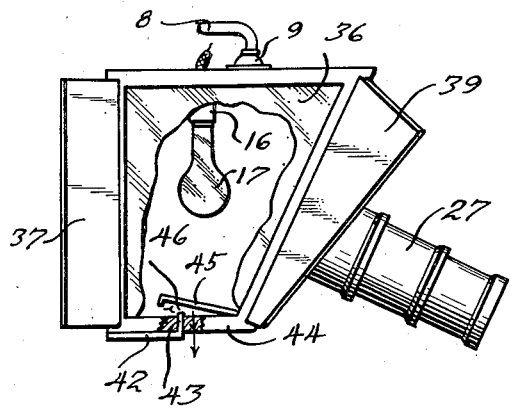
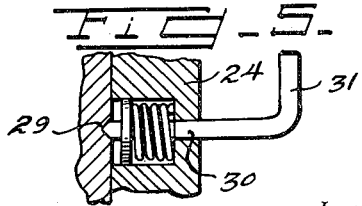
Inventor
*Francis Victor Rahner*
By *Clarence A. O'Brien
and Harvey B. Jacobson*
Attorneys March 13, 1951 F. V. RAHNER 2,545,382
PORTABLE PHOTOGRAPHIC LIGHT HAVING AN
ADJUSTABLE LIGHT CHAMBER
Filed Oct. 23, 1946 2 Sheets-Sheet 2
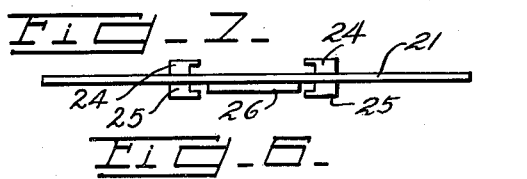
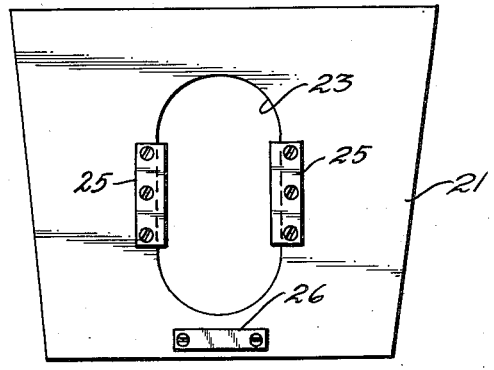
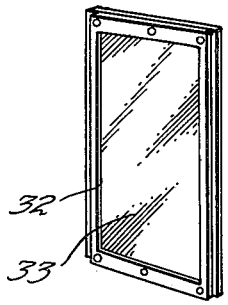
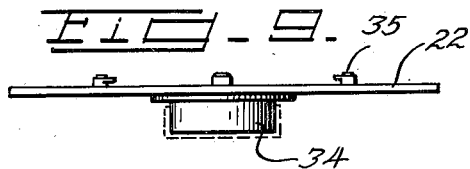
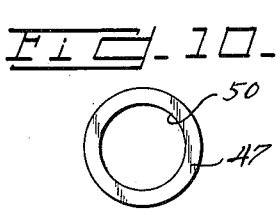
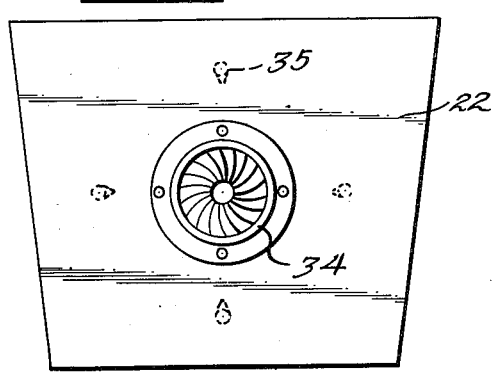
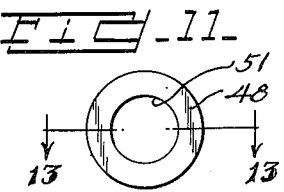
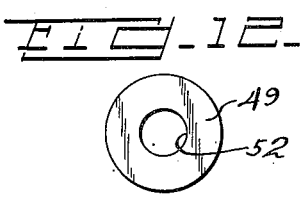
Inventor
Francis Victor Rahner
By Clarence A. O'Brien
and Harvey B. Jacobson
Attorneys Patented Mar. 13, 1951

2,545,382

UNITED STATES PATENT OFFICE 2,545,382

PORTABLE PHOTOGRAPHIC LIGHT HAVING AN ADJUSTABLE LIGHT CHAMBER

Francis Victor Rahner, St. Augustine, Fla.

Application October 23, 1946, Serial No. 705,067

3 Claims. (Cl. 240—1.3)

The present invention relates to new and useful improvements in photographic lights to provide a desired illumination of a subject to be photographed and more particularly to a portable light of this character.

An important object of the present invention is to provide a light of this character including a light chamber adapted for vertical and horizontal adjustment and including interchangeable front panels on the chamber by means of which a telescopic hood may be provided for concentrating the light on the subject, or by means of which various types of light filters, or light modifying or controlling attachments may be mounted in position at the front of the chamber.

A further object of the invention is to provide a device of this character of simple and practical construction, which provides flexibilty and speed in photographic light control, and which at the same time is relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view of the light chamber;

Figure 3 is a front elevational view with parts broken away and shown in section;

Figure 4 is a side elevational view with parts broken away and shown in section;

Figure 5 is an enlarged fragmentary sectional view showing the vertical adjustment for the telescope hood;

Figure 6 is a rear elevational view of the removable front panel;

Figure 7 is a top plan view thereof;

Figure 8 is a front elevational view of a removable panel provided with an iris diaphragm;

Figure 9 is a top plan view thereof;

Figures 10 to 12 inclusive are views of the aperture reducers for the telescope hood;

Figure 13 is a sectional view taken on the line 13—13 of Figure 11, and

Figure 14 is a perspective view of a light filter for mounting behind the telescope hood.

Referring now to the drawings in detail, wherein for the purpose of illustration I have disclosed a preferred embodiment of the invention, the numeral 5 designates a portable stand of conventional construction and including a vertically adjustable standard 6 having counter-balanced weights 7 attached thereto and mounted on the upper portion of the stand 5 to secure the standard 6 in vertically adjusted position. The upper portion of the standard 6 is provided with a horizontally extending arm 8 having a conventional swivel member 9 at its outer end which is swively connected to the intermediate portion of a transverse brace 10 secured at the top of a light chamber designated generally at 11.

The light chamber includes a frame 12 which is open at its top and the brace 10 is provided with a rod 13 rigidly secured longitudinally of the brace with the ends of the rod pivoted in the sides of the frame 12 and provided with wing nuts 14 for securing the light chamber in swingably vertically adjusted position.

A second brace 15 is fixedly secured in the top of the frame 12 for supporting a lamp socket 16 at its underside in which a lamp 17 is mounted, the socket having an extension cord 18 extending therefrom for connecting the lamp to a house circuit.

The light chamber 11 is provided with a rearwardly sloping open front frame 19 which tapers toward its lower portion and provided at its side edges with opposed channel guides 20 in which either of opaque front panels 21 and 22 is interchangeably mounted.

The front panel 21 is provided with a vertically extending oval-shaped opening 23 and with panel guides 24 and 25 on its front and rear surfaces respectively at the side edges of the opening. A stop 26 is secured to the rear surface of the panel 21 below the opening.

An adjustable telescope hood 27 is mounted on a rectangular base 28 which is slidably positioned in the front guides 24, one edge of the plate having vertically spaced notches 29 therein for selectively receiving the spring projected locking pin 30 slidably mounted in one of the guides 24 to secure the hood 27 in vertically adjusted position at the front of the light chamber. The outer end of the locking pin is formed with a releasing handle 31 to retract the locking pin when vertically adjusting the plate 28.

A filter frame 32 in which the edges of a filter 33 of any suitable translucent material is secured is slidably received in the guides 25 at the rear of the panel 21, the lower edge of the frame 32 resting on the stop 26.

The filter panel 22 is provided at its front surface with a standard iris diaphragm 34 and the rear surface of the panel 22 is provided with circularly arranged pivoted buttons 35 by means of which the flange of a standard filter hoop may be secured on the panel, the panel 22 being reversed in the front of the light chamber when the filter hoop is used so that the buttons 35 and hoop will be positioned on the outside of the panel.

The sides of the chamber 11 are provided with windows 36 of suitable translucent material, and at each side of the box is a rear rectangular door 37 swingable on hinges 38 at the rear edge of the door and a triangular shaped door 39 is swingable at its front edge on hinges 40 secured to the sides of the front frame 19. The free edges of the doors 37 and 39 are vertical and the free edge of the door 39 is overlapped by a light sealing strip 41 secured to the free edge of the door 37.

The rear portion of the bottom of the chamber 11 is closed by a bottom plate 42 having an upstanding flange 43 at its front edge to form an opening 44 in the bottom of the chamber at the front thereof. Light rays are excluded from passing through the opening 44 by means of an upwardly inclined baffle 45 secured at its front edge to the front of the chamber and spaced upwardly above the flange 43 and projecting rearwardly therefrom. A passage 46 is thus provided between the flange 43 and the baffle 45 to provide air circulation means in the chamber, but to prevent light being projected downwardly from the chamber.

In Figures 10, 11 and 12 I have illustrated several forms of aperture reducers which comprise caps 47, 48 and 49 respectively, adapted for interchangeable mounting on the end of the telescope hood 27. The cap 47 is formed with a relatively large opening 50 while the cap 48 is formed with an intermediate sized opening 51 and the cap 49 is formed with a smaller opening 52.

From the foregoing it will be apparent that the stand 5 provides a portable mounting for the light chamber 11 and the light chamber is vertically adjusted on the standard 6 and the front end of the chamber may be tilted vertically on the rod 13 and secured in its adjusted position by the wing nut 14.

By mounting the telescope hood 27 on the front panel 21 and mounting the front panel in the front of the light chamber the light beam may be concentrated on the subject and the light beam may also be adjusted vertically by securing the plate 28 in its vertically adjusted position in the guide 24.

The filter frame 32 is removably supported behind the panel 21 in the guide 25 and interchangeable filters may be employed having various media for light transmission, such as glass, traceoline, cellophane, tracing cloth, etc. in desired colors.

The panel 22 provides means for interchangeably mounting the iris diaphragm 34 at the front of the light chamber, or the panel 22 may be reversed in the front of the light chamber to secure a standard filter hoop thereon by means of the buttons 35.

In view of the foregoing description taken in conjunction with the accompanying drawings it it believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A photographic lamp comprising a stand, a horizontal arm at the upper end of the stand, a lamp chamber, a cross bar at the top of the chamber pivoted at its ends to the sides of the chamber for vertical tilting movement of the front of the chamber, swivel means suspending the cross bar to the arm to suspend said chamber beneath said arm for horizantal turning movement of the chamber, a panel removably mounted at the front of the chamber and having a light emitting aperture therein, light beam controlling means mounted over the aperture, translucent side walls for the chamber, and closure means for said side walls comprising sectional doors for each side wall with the sections independently operative for opening and closing movement.

2. A photographic lamp comprising a stand, a horizontal arm at the upper end of the stand, a lamp chamber, a cross bar at the top of the chamber pivoted at its ends to the sides of the chamber for vertical tilting movement of the front of the chamber, means connecting the cross bar to the arm for horizontal turning movement of the chamber, a panel removably mounted at the front of the chamber and having a light emitting aperture therein, light beam controlling means mounted over the aperture, translucent side walls for the chamber, swinging closures for the side walls, said chamber having a ventilating opening in the bottom thereof, and a baffle for the opening shielding the opening from the direct escape of light from the chamber.

3. A photographic lamp comprising a stand, a lamp chamber mounted on said stand and having a rear bottom closure plate and a ventilating opening forwardly of said plate, front light emitting means, and translucent side walls, swingable closures for said side walls, and baffle means for said opening shielding the same against direct escape of light from said chamber comprising an upstanding front edge flange on said closure plate, and a baffle plate in the bottom of said chamber inclining upwardly and rearwardly over said flange and closure plate in spaced relation thereto.

FRANCIS VICTOR RAHNER.

REFERENCES CITED

The following references are of record in the file of this patent:

UNITED STATES PATENTS

| Number | Name | Date |
|---|---|---|
| 685,806 | Weber | Nov. 5, 1901 |
| 1,263,234 | Hanson | Apr. 16, 1918 |
| 1,536,623 | Norwell | May 5, 1925 |
| 1,743,242 | Leoty | Apr. 8, 1930 |
| 1,834,428 | Seitz | Dec. 1, 1931 |
| 2,171,028 | Gelb | Aug. 29, 1939 |
| 2,213,382 | Busse | Sept. 3, 1940 |
| 2,216,478 | Paillard | Oct. 1, 1940 |
| 2,287,328 | Rose | June 23, 1942 |
| 2,287,345 | Erikson | June 23, 1942 |
| 2,310,509 | Brandt | Feb. 9, 1943 |